(12) United States Patent
Bihari et al.

(10) Patent No.: US 11,400,642 B2
(45) Date of Patent: Aug. 2, 2022

(54) 3D PRINTING HEAT RESISTANT SUPPORT MATERIAL

(71) Applicant: SHPP Global Technologies B.V., Bergen op Zoom (NL)

(72) Inventors: Malvika Bihari, Evansville, IN (US); Robert Russell Gallucci, Mt Vernon, IN (US); Juha-Matti Levasalmi, Delmar, NY (US); Paul Sybert, Mt Vernon, IN (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 209 days.

(21) Appl. No.: 16/695,985

(22) Filed: Nov. 26, 2019

(65) Prior Publication Data

US 2020/0189180 A1    Jun. 18, 2020

Related U.S. Application Data

(60) Provisional application No. 62/781,266, filed on Dec. 18, 2018.

(30) Foreign Application Priority Data

Jan. 31, 2019  (EP) .................................. 19154776

(51) Int. Cl.
| | |
|---|---|
| *B29C 64/118* | (2017.01) |
| *B29C 64/40* | (2017.01) |
| *B33Y 10/00* | (2015.01) |
| *B33Y 70/00* | (2020.01) |
| *B33Y 80/00* | (2015.01) |
| *C08K 3/36* | (2006.01) |
| *C08K 3/38* | (2006.01) |

(52) U.S. Cl.
CPC ............ *B29C 64/118* (2017.08); *B29C 64/40* (2017.08); *B29K 2869/00* (2013.01); *B33Y 10/00* (2014.12); *B33Y 70/00* (2014.12); *B33Y 80/00* (2014.12); *C08K 3/36* (2013.01); *C08K 3/38* (2013.01)

(58) Field of Classification Search
CPC ......... B29C 64/40; B33Y 10/00; B33Y 10/70; B29K 2869/00; C08K 3/36; C08K 3/40
See application file for complete search history.

(56) References Cited

U.S. PATENT DOCUMENTS

| | | |
|---|---|---|
| 3,554,984 A | 1/1971 | George |
| 3,658,773 A | 4/1972 | Zecher et al. |
| 4,404,350 A | 9/1983 | Ryang |
| 4,690,997 A | 9/1987 | Cella et al. |
| 4,808,686 A | 2/1989 | Cella et al. |
| 4,910,288 A | 3/1990 | Dellacoletta |
| 7,250,127 B2 | 7/2007 | Geck et al. |
| 7,847,023 B2 | 12/2010 | Gallucci et al. |
| 7,897,666 B1 | 3/2011 | Berg |
| 8,013,251 B2 | 9/2011 | Bhandari et al. |
| 8,017,697 B2 | 9/2011 | Carrillo et al. |
| 8,669,332 B2 | 3/2014 | Carrillo et al. |
| 9,909,006 B2 | 3/2018 | Ramalingam et al. |
| 2003/0004600 A1 | 1/2003 | Priedeman, Jr. |
| 2004/0222561 A1 | 11/2004 | Hopkins |
| 2016/0122541 A1 | 5/2016 | Jaker et al. |
| 2018/0281276 A1 | 10/2018 | Milroy et al. |
| 2020/0189181 A1 | 6/2020 | Bihari et al. |

FOREIGN PATENT DOCUMENTS

| | | |
|---|---|---|
| JP | 6359793 B1 | 6/2018 |
| WO | 2015160957 A1 | 10/2015 |
| WO | 2017191150 A1 | 11/2017 |
| WO | 2018049365 A1 | 3/2018 |

*Primary Examiner* — Edward J Cain
(74) *Attorney, Agent, or Firm* — Cantor Colburn LLP

(57) ABSTRACT

A filament for use in forming a support structure in fused filament fabrication, the filament comprising an amorphous, thermoplastic resin further comprising Bisphenol Isophorone carbonate units and Bisphenol A carbonate units, wherein the Bisphenol Isophorone carbonate units are 30 to 50 mole percent of the total of Bisphenol A carbonate units and Bisphenol Isophorone carbonate units in the resin, and wherein the resin has a glass transition temperature from 165° C. to 200° C. The composition used to form the support filament exhibits a desirable combination of filament formability, printability, lack of significant oozing from the printer nozzle, and good ease of mechanical separation from the build material at room temperature after printing.

15 Claims, No Drawings

3D PRINTING HEAT RESISTANT SUPPORT MATERIAL

CROSS-REFERENCE TO RELATED APPLICATIONS

This application claims priority to European Application No. 19154776.9, filed Jan. 31, 2019, which claims priority to U.S. Provisional Application No. 62/781,266 filed Dec. 18, 2018, which are incorporated by reference herein in their entirety.

BACKGROUND OF THE INVENTION

Fused filament fabrication ("FFF"), also known as fused deposition modeling, is an additive manufacturing technique wherein the FFF printer deposits layer over layer of a thermoplastics build material to create a 3D model. During printing, each new layer must be supported by the layer beneath it. If the model to be printed requires support, such as for such as an overhang or bridge, to maintain its desired shape, the printing of support structures may be needed to support the model until the model cools sufficiently to maintain its structure.

In the FFF process, the build material and support material, as feedstock, are fed to the FFF printer in filament form. These build and support material filaments are then separately heated to liquefy each and then to extrude them through separate nozzles to enable the printing of the model and support structures.

The support structure is subsequently removed from the completed model by physical separation, dissolution, or a combination of the two.

An ideal support material must satisfy many different and sometimes contradictory requirements, including the ability to be readily extruded to form a high-precision filament, the ability to be printed to form a support structure, and an affinity for the build material that is sufficient to enable support of the build material during printing but not so great as to interfere with removal of the support structure from the final model or to damage it during removal of the support structure from the model.

To print using a build material, with a high heat resistance, such as a polyetherimide resins, elevated printing temperatures are required to print these build materials. When printing with these high heat resistant build materials, the support material must also be sufficiently resistant to these elevated temperatures to maintain enough stiffness to provide structural support to the build material. There remains a need for heat resistant support materials exhibiting an improved balance of these properties.

SUMMARY OF THE INVENTION

One embodiment is an article of manufacture comprising a filament for use in 3D printing wherein the filament comprises an amorphous, thermoplastic resin further comprising Bisphenol Isophorone carbonate units and Bisphenol A carbonate units, wherein the Bisphenol Isophorone carbonate units, are 30 to 50 mole percent of the total of Bisphenol A carbonate units, and Bisphenol Isophorone carbonate units in the resin, and wherein the resin has a glass transition temperature (Tg) from 165° C. to 200° C.

Another embodiment is an article of manufacture comprising (a) a support structure which comprises an amorphous, thermoplastic resin further comprising Bisphenol Isophorone carbonate units and Bisphenol A carbonate units, wherein the Bisphenol Isophorone carbonate units, are 30 to 50 mole percent of the total of Bisphenol A carbonate units, and Bisphenol Isophorone carbonate units in the resin, and wherein the resin has a Tg from 165° C. to 200° C., and (b) a three dimensional model which comprises a polyetherimide, and wherein at least a portion of a surface of the support structure is adhered to at least a portion of a surface of the three dimensional model.

Yet another embodiment is a method of fused filament fabrication comprising: melting a portion of a first filament to form a first thermally-solidifiable material in molten form, and dispensing the first thermally-solidifiable material in molten form in a predetermined pattern so as to define a three-dimensional object; and melting a portion of a second filament to form a second thermally-solidifiable material in molten form, and, in coordination with the dispensing the first thermally solidifiable material, dispensing the second thermally-solidifiable material in molten form so as to define a support structure for the three-dimensional object; wherein the first thermally-solidifiable material comprises a polyetherimide, wherein the second thermally-solidifiable material comprises an amorphous, thermoplastic resin further comprising Bisphenol Isophorone carbonate units and Bisphenol A carbonate units, wherein the Bisphenol Isophorone carbonate units, are 30 to 50 mole percent of the total of Bisphenol A carbonate units, and Bisphenol Isophorone carbonate units in the resin, and wherein the resin has a Tg from 165° C. to 200° C.; and wherein the first thermally-solidifiable material has a glass transition temperature or a melting point in a range of within 30° C. of the Tg of the second thermally-solidifiable material.

These and other embodiments are described in detail below.

DETAILED DESCRIPTION

The terms, as used herein, have the following meanings.

The terms "a" or "an" means one or more.

The carbon atom content of the various hydrocarbon-containing moieties herein may be indicated by a prefix designating the minimum and maximum number of carbon atoms in the moiety, for example, the prefixes ($C_a$-$C_b$)alkyl, and $C_{a-b}$-alkyl, indicate an alkyl moiety of the integer "a" to "b" carbon atoms, inclusive. Thus, for example, ($C_1$-$C_6$) alkyl and $C_{1-6}$alkyl refer to an alkyl group of one to six carbon atoms inclusive.

A substituent, as defined herein, is an atom or group, which is bound to the parent chain of a thermoplastic resin or silicone. The substituent may be monovalent or divalent.

A bridging group, spacer, linker or diyl group is any part of a molecule or polymer repeating unit with formula connected by single bonds to two other distinct atoms in the rest of the molecule or repeating unit.

The term "alkyl" denotes a straight or branched aliphatic, saturated or unsaturated, monovalent substituent. Examples of alkyl groups include methyl, ethyl, propyl, isopropyl, butyl, isobutyl, vinyl, allyl, 2-methylpropenyl, 2-butenyl, 1,3-butadienyl, ethynyl, propargyl, and the like.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue.

The term "alkanediyl" means a divalent aliphatic radical, saturated or unsaturated, bridging group having from 1 to 10 carbon atoms, such as methylene, ethylene, propylene, butylene, pentylene, hexylene, heptylene, octylene, nonylene, decylene, and isomeric forms thereof.

The term "aryl" denotes a monocyclic or polycyclic aromatic hydrocarbon group, for example, anthracenyl, fluorenyl, naphthyl, phenanthrenyl, phenyl, and the like. The term "arylene" means a diradical obtained by removing two nuclear hydrogen atoms from a monocyclic or polycyclic aromatic hydrocarbon groups. Illustrative of arylene are phenylene, tolylene, xylylene, naphthylene, diphenylylene.

The term "cycloalkylene" means a monocyclic or polycyclic, cycloaliphatic, saturated or unsaturated, divalent radical such as 1,3-cyclobutylene, 1,3-cyclopentylene, 2-methyl-1,3-cyclopentylene, 2-ethyl-1,3-cyclopentylene, 1,4-cyclohexylene, 2-methyl-1,4-cyclohexylene, 1,3-cycloheptylene, 1,4-cycloheptylene, 5-methyl-1,3-cycloheptylene, 1,3-cyclooctylene, 5-methyl-1,3-cyclooctylene, 1,4-cyclooctylene, and the like.

"Cycloalkylidene" means a monocyclic or polycyclic, saturated or unsaturated, cycloalkyl group linked to the remainder of the molecule via a double bond. The definitions and illustrations provided herein for cycloalkyl groups apply with appropriate modification also to cycloalkylidene groups.

The term "alkoxy" refers to straight or branched, monovalent, saturated or unsaturated aliphatic chains of carbon atoms bonded to an oxygen atom that is attached to a core structure. Examples of alkoxy groups include methoxy, ethoxy, propoxy, butoxy, iso-butoxy, and the like.

The term "cycloalkyl" denotes a saturated or unsaturated monocyclic or polycyclic cycloalkyl group. Cycloalkyl groups may be optionally fused to aromatic hydrocarbons such as benzene to form fused cycloalkyl groups, such as indanyl and the like. Examples of cycloalkyl groups include cyclopropyl, cyclobutyl, cyclopentyl, cyclohexyl, cycloheptyl, and the like.

The term "halogen" or "halo" represents chloro, bromo, fluoro, and iodo atoms and substituents.

The term "melt", as used herein means to heat an amorphous polymer above its glass transition temperature or, for a crystalline polymer, to heat to cause a phase change from the solid phase to a liquid phase.

A repeating unit or unit means a part of a polymer whose repetition, by itself or with other repeat units in a copolymer, would produce the complete polymer chain (except for the end-groups) by linking the repeat units together successively along the chain.

The term "substituted" means that a hydrogen atom on a molecule has been replaced with a different atom or molecule. The atom or molecule replacing the hydrogen atom is denoted as a substituent.

The present inventors have determined that support filaments and materials described herein are useful to support the 3D printing of heat resistant model materials, such as polyetherimide, and are more readily separable from the printed models than are presently available support materials.

In one embodiment, the article of the present invention comprises a filament useful for forming a support structure for 3D printing. Typically, the filament has an average diameter from 1 to 5 millimeters with a standard deviation of +0.1 millimeters.

This filament comprises 95.5 to 99.5 weight percent of an amorphous, thermoplastic resin, having a Tg from 165° C. to 200° C., and 0.5 to 4.5 weight percent of a high viscosity silicone, having a kinematic viscosity from 600,000 to 20 million centistokes (cSt), based upon the combined weight of the thermoplastic resin and silicone in the filament.

In one embodiment of the composition of the filament, the amorphous, thermoplastic resin comprises a Bisphenol A polycarbonate homopolymer and (a) a copolycarbonate of Bisphenol A carbonate units (or "BPA units") and Bisphenol Isophorone carbonate units (or "BPI units") or (b) a BPI polycarbonate homopolymer; wherein the BPI units are 30 to 50 mole percent of the total of BPA units and BPI units in the thermoplastic resin. In another embodiment, the BPA unit has the formula (1a):

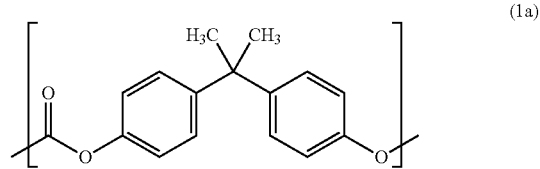

(1a)

and the BPI unit has the formula (1b):

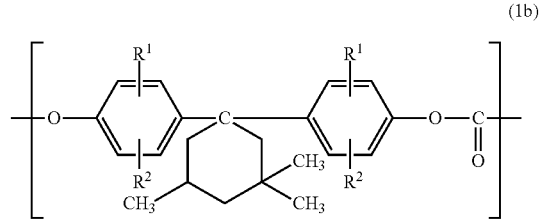

(1b)

wherein $R^1$ and $R^2$ are independently H or $C_1$-$C_{10}$-alkyl. In another embodiment, the resin has a Tg from 165° C. to 200° C. In a further embodiment, the Bisphenol A polycarbonate is a linear polycarbonate, a branched polycarbonate or a linear polycarbonate and a branched polycarbonate. The term "polycarbonate" and "polycarbonate resin" refers to polymers having repeating units of the formula —C(O)—O—$R^{100}$-O— (hereinafter "formula 1c") wherein each $R^{100}$ may independently comprise any suitable organic group, such as an aliphatic, alicyclic, or aromatic group, or any combination thereof. In certain embodiments, $R^{100}$ may be a $C_6$-$C_{24}$ aromatic group wherein at least one moiety is aromatic. The polycarbonate may include repeating units of the formula —C(O)—O-A-Y-A-O— (hereinafter "formula 1d") wherein each A is a monocyclic divalent aryl group and each A can be the same or different. Y is a bridging group having one or two atoms that separate each A such as O, S, S(O), S(O)$_2$, C(O), methylene, cyclohexyl-methylene, 2-[2.2.1]-bicycloheptylidene, ethylidene, isopropylidene, neopentylidene, cyclohexylidene, cyclopentadecyclidene, cyclododecylidene, and adamantylidene. The repeating units of formula (1) may be derived from dihydroxy compounds as described in WO2015160957.

In yet another embodiment, the amorphous, thermoplastic resin comprises a copolymer of BPA units and BPI units, a linear polycarbonate and a branched polycarbonate. Preferably $R^1$ and $R^2$ are all H.

The BPI unit containing copolymer can include those available commercially as APEC® copolycarbonate resins (Covestro AG). Especially useful is APEC 2095 and APEC 2097 resin from Covestro AG (~205° C. Tg, ~55-60 mol % BPI).

In an alternate embodiment, branching agents are added to the BPI/BPA copolymers to increase viscosity of the resin. Various end caps can also be used to control the MW of the resin such as phenol, p-cumylphenol, p-tert-butylphenol and p-octylphenol and the like. Mono functional acids or acid chlorides may also be used as endcaps.

The composition of the filament of the present invention also comprises a high viscosity silicone, having a kinematic viscosity from 600,000 to 20 million cSt.

Silicones, also known as polyorganosiloxanes or polysiloxanes, are polymers having alternate silicon and oxygen atoms in the skeletal structure, and containing silicon-bonded hydrocarbon radicals, the hydrocarbon radicals being attached to the silicon through carbon-silicon linkages wherein the silicone have the general formula $R_rSiO_{(4-r/2)}$, wherein r is 0, 1, 2 or 3, with the proviso that the average numerical value of r is in the range from 1.9 to 2.1, and wherein each R is independently hydrogen, hydroxyl, or substituted or unsubstituted hydrocarbon radicals such as, for instance, alkyl radicals (e.g., methyl, ethyl, and propyl); aryl radicals (e.g., phenyl, naphthyl); alkaryl radicals (e.g., tolyl, xylyl); aralkyl radicals (e.g., benzyl, phenyl-ethyl); alkoxy, cycloalkyl radicals such as cyclohexyl; and heterocyclic radicals. The hydrocarbon radical may be substituted with essentially inert substituents as, for example, halogens. The silicone resins are 3-dimensional cross-linked relatively rigid solid polymers when hardened or cured. High viscosity silicone, as used herein, represents a wide range of polysiloxane materials having a high molecular weight and include, for example, fluids and gums with a viscosity ranging from about 500,000 to 100 million cSt, preferably from about 600,000 to 20 million, more preferably from about 600,000 to 12 million cSt. All ranges mentioned herein include all subranges, e.g. 550,000; 925,000; 3.5 million.

Suitable silicones include, but are not limited to high viscosity linear polydimethylsiloxane fluids ranging in viscosity from 300,000 cSt to 20,000,000 cSt available from CLEARCO Products Co., Inc.; ultrahigh-molecular-weight polydimethylsiloxane with a viscosity from 10-20 million cSt available from Wacker Chemie AG as GENIOPLAST® Gum; GENIOPLAST® Pellet P an ultrahigh-molecular-weight polydimethylsiloxane in pellet form comprised of a combination of 100 parts methyl vinyl functional polydiorganosiloxane with up to 200 parts fumed silica and up to 20 parts of boric acid, as described in U.S. Pat. No. 7,897,666 by Daniel Berg; and GENIOPLAST® Pellet S an ultrahigh-molecular-weight polydimethylsiloxane in pellet form comprising Trimethylsiloxy-endcapped poly(dimethylsiloxane-co-vinylmethylsiloxane) (70 weight percent) on fumed silica (30 weight percent) and treated with boric acid to form a boro-silicone as described in U.S. Pat. No. 7,250,127 by Michael Geck et al.

These high viscosity silicones, often characterized as silicone gums which are comprised of about 20-100% siloxane polymers. The term "gum" means a silicone polymer having a degree of polymerization sufficient to provide a silicone having a gum-like texture. Also, the silicone gum may also be purchased in the form of a solution or dispersion in a silicone compatible vehicle such as volatile or nonvolatile silicone.

Illustrative gums will comprise poly(dimethylsiloxanes), copolymers of dimethylsiloxane and methylvinylsiloxane, copolymers of dimethylsiloxane and diphenylsiloxane, terpolymers of dimethylsiloxane, phenylmethylsiloxane, and methylvinylsiloxane, terpolymers of dimethylsiloxane, methylvinylsiloxane and methyltrifluoropropylsiloxane, copolymers of dimethylsiloxane and ethylvinylsiloxane, and copolymers of dimethylsiloxane and methylcyanoethylsiloxane. The homo- and copolymers can be blocked at the ends, e.g., with triorganosiloxy units, such as trimethylsiloxane, dimethylvinylsiloxane, dimethylphenylsiloxane units, and the like. Preferably, the organo substituents in the gum will be selected from methyl, vinyl, phenyl or trifluoropropyl. However, other organic radicals may also be included, such as ethyl, propyl, octadecyl, allyl, cyclohexenyl, naphthyl, chloromethyl, bromophenyl, and the like.

The compositions can be vulcanized or rendered vulcanizable by any methods conventional in silicone rubber technology, e.g., by heat or high energy radiation. Preferably, however, the composition will include a small but effective amount of a heat-reactive vulcanization catalyst. The preferred such catalysts will be organic peroxides and organic per-esters, for example, benzoyl peroxide, tertiary butyl peracetate, dicumyl peroxide, cumyl tert. butyl peroxide, 2,5-di-tert-butyl peroxy-2,5-dimethyl hexane, 2,4-dichlorobenzoyl peroxide, tert-butyl perbenzoate, hexylene glycol perbenzoate, and the like. The preferred catalysts are 2,4-dichlorobenzoyl peroxide and benzoyl peroxide.

One method to produce pelletized organopolysiloxane material is to take 100 parts of one or more dipolyorganosiloxane(s) end-capped by trialkylsiloxy groups, most preferably by trimethylsiloxy groups, and composed of from 70 to 100%, more preferably from 90 to 100%, of dimethylsiloxane units, and from 0 to 30%, more preferably from 0 to 10%, of alkenylmethylsiloxane units, most preferably vinylmethylsiloxane units, with a viscosity which is preferably from $10^3$ to $10^8$ cSt at 25° C., more preferably from $10^5$ to $10^8$ cSt at 25° C., are mixed in a kneader operated at from 100 to 250° C., most preferably at from 120 to 200° C., preferably with from 0 to 50 parts, more preferably from 0.1 to 30 parts, of additives (D), and preferably with from 1 to 200 parts, more preferably with from 30 to 100 parts, of one or more reinforcing or non-reinforcing fillers (B), or a mixture of the two, and preferably kneaded for from 10 minutes to 12 hours, more preferably from 30 minutes to 6 hours.

The poly(diorganosiloxane) gums are highly viscous masses or gummy elastic solids depending on the state of condensation, the condensing agent employed, and the starting organopolysiloxane used to make the gummy material. A typical gum is obtained by the condensation of a liquid poly(organosiloxane) with one of the well-known condensing agents, e.g., ferric chloride hexahydrate, phenyl phosphoryl chloride, alkaline condensing agents, such as potassium hydroxide, sodium hydroxide and the like. A typically useful gum is prepared by mixing together about 95 mole % of octamethylcyclotetrasiloxane, and about 5 mole % decamethyltetrasiloxane at a temperature of 150°-175° C. for about 4 hours with about 0.01% potassium hydroxide until a highly viscous gum is obtained.

Furthermore, the polyorganosiloxanes may include reinforcing and/or non-reinforcing fillers. Examples of reinforcing fillers are fumed or precipitated silicas. If reinforcing fillers are used, it is preferable to use fumed or precipitated silicas with BET surface areas of at least 50 $m^2/g$, more preferably at least 100 $m^2/g$. Preferably, the silicone comprises 60 to 80 weight percent of silicone gum and 20 to 40 weight percent of fumed silica.

Examples of non-reinforcing fillers are quartz flour, diatomaceous earth, calcium silicate, zirconium silicate, zeolites, metal oxide powder such as aluminum, titanium, iron, or zinc oxide, barium silicate, barium sulfate, gypsum, polytetrafluoroethylene. Furthermore, can be used as fillers fibrous components such as glass and plastic fibers.

Generally, where the composition includes a filler, the filler may be a single filler or a mixture of fillers. The preferred fillers are finely divided reinforcing fillers, e.g., silica, either aerogel or fumed, having a specific surface area of 50 to 350 m$^2$/g. Other fillers, such as semi-reinforcing and extending fillers, such as diatomaceous earth, ground quartz, alkaline earth sulfates or silicates (e.g., zirconium silicate), metallic oxides, such as iron oxide, zinc oxide, aluminum oxide, titanium dioxide, and the like, and carbon black, can also be present.

The filament can, optionally, further comprise one or more additives known in the thermoplastics art. Such additives can include, for example, stabilizers, antioxidants, dyes, pigments, anti-static agents, mineral oil, metal deactivators, and combinations thereof. When present, the one or more additives can be used in a total amount of up to 2 weight percent, based on the weight of the filament. Within this range, the additive amount can be up to 1 weight percent, or 0.2 to 1 weight percent.

In a second embodiment, an article of the present invention comprises a structure comprising a model and a support structure wherein at least a portion of a surface of the support structure is adhered to at least a portion of a surface of the model, wherein the model comprises a build material and wherein the support structure comprises an amorphous, thermoplastic resin and a high viscosity silicone.

Yet a third embodiment of the present invention is a method of fused filament fabrication to print a model structure from a build material and a support structure for the model from an amorphous, thermoplastic resin.

Each of the aforementioned support filaments, and their compositions are suitable for the article and method provided that the amorphous thermoplastic resin in the support filament does not contain the same base polymer as that included within the build material. In one embodiment the support filament's Tg is within 30° C. of the Tg or melting point of the build material.

In one embodiment, build materials suitable for the model include, but are not limited to, polyetherimides and polysulfones wherein the polyetherimide can be selected from polyetherimide homopolymers, polyetherimide co-polymers such as with siloxane or sulfone, and combinations thereof, and blends with polycarbonate.

In one embodiment, the polyetherimide build material is a polymer comprising etherimide units of formula (2a), shown below,

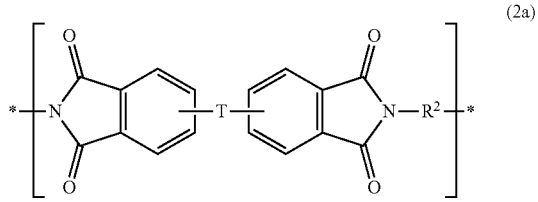

(2a)

wherein T is —O— or a group of the Formula —O—Z—O— wherein the divalent bonds of the —O— or the —O—Z—O— group are in the 3,3', 3,4', 4,3', or the 4,4' positions of the phthalimide groups; Z includes divalent moieties of the formula

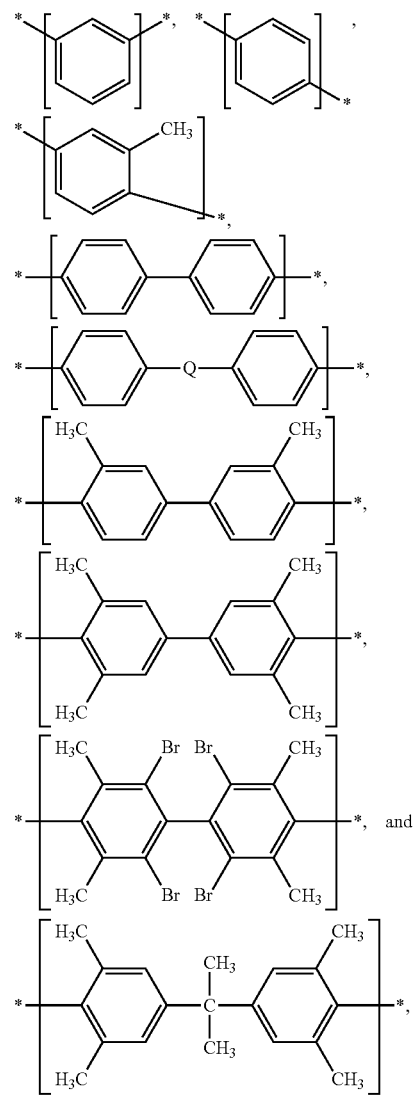

wherein Q is a divalent moiety that can be —O—, —S—, —C(O)—, —SO$_2$—, —SO—, —C$_y$H$_{2y}$— wherein y is 1 to 8, or —C$_p$H$_q$F$_r$— wherein p is 1 to 8 and q is 0 to 15 and r is 1 to 16 and q+r=2p; and R$^2$ is independently at each occurrence a divalent group selected from the group consisting of substituted or unsubstituted divalent aromatic hydrocarbon moieties having 6 to 20 carbons, straight or branched chain alkylene moieties having 2 to 20 carbons, cycloalkylene moieties having 3 to 20 carbon atoms, and divalent moieties of the general formula (2b)

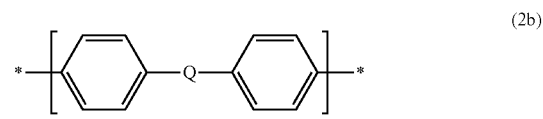

(2b)

wherein Q is defined above. In this context, "substituted" means including at least one substituent such as a halogen (i.e., F, Cl, Br, I), hydroxyl, amino, thiol, carboxyl, carboxylate, amide, nitrile, sulfide, disulfide, nitro, $C_1$-$C_{18}$ alkyl, $C_1$-$C_{18}$ alkoxyl, $C_6$-$C_{18}$ aryl, $C_6$-$C_{18}$ aryloxyl, $C_7$-$C_{18}$ alkylaryl, or $C_7$-$C_{18}$ alkylaryloxyl.

In some embodiments, each occurrence of $R^2$ is independently para-phenylene or meta-phenylene, and T is a group of the formula —O—Z—O— wherein Z is a divalent moiety of the formula

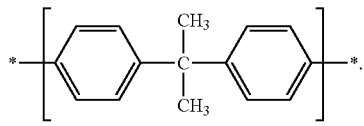

Methods of forming such polyetherimides are described in U.S. Pat. No. 4,910,288 by Brent A. Dellacoletta.

In another embodiment, the polyetherimide is a copolymer of etherimide units of formula (2a) and siloxane units of formula (1b). Methods of forming such copolymers are described, for example, in U.S. Pat. No.: 7,847,023 by Robert Russell Gallucci et al., U.S. Pat. No. 4,404,350 by Hong-Son Ryang, U.S. Pat. Nos. 4,808,686 and 4,690,997 by James A. Cella et al., and U.S. Pat. No. 8,013,251 by Yashpal Bhandari et al. In one embodiment, the polyetherimide is a polyetherimide-polysiloxane block copolymer, commercially available from SABIC as SILTEM™ resin.

In the embodiment wherein the polyetherimide is a polyetherimide sulfone co-polymer, the copolymer may be made from the reaction of a dianhydride and a diamine. Exemplary dianhydrides have the formula (2c)

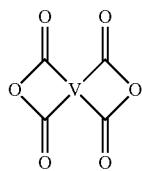

(2c)

wherein V is a tetravalent linker selected from the group consisting of substituted or unsubstituted, saturated, unsaturated or aromatic monocyclic and polycyclic groups having 5 to 50 carbon atoms, substituted or unsubstituted alkyl groups having 1 to 30 carbon atoms, substituted or unsubstituted alkenyl groups having 2 to 30 carbon atoms and combinations comprising at least one of the foregoing linkers. Suitable substitutions and/or linkers include, but are not limited to, carbocyclic groups, aryl groups, ethers, sulfones, sulfides amides, esters, and combinations comprising at least one of the foregoing. Useful diamines include diamino diaryl sulfones and combinations thereof. Diamino diaryl sulfones (DAS) have the general formula (2d):

$$H_2N-Ar^1-SO_2-Ar^2-NH_2 \quad (2d)$$

wherein $Ar^1$ and $Ar^2$ independently are an aryl group containing a single or multiple rings. Several aryl rings may be linked together, for example through ether linkages, sulfone linkages or more than one sulfone linkages. The aryl rings may also be fused. In one embodiment $Ar^1$ and $Ar^2$ independently comprise 5 to 12 carbons. Methods of forming such polyetherimide sulfones are described in U.S. Pat. No. 9,909,006 by Hariharan Ramalingam et al.

In an embodiment the polyetherimide sulfone comprises structural units having the formula (2e)

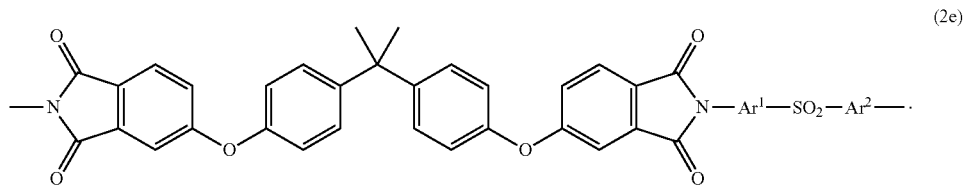

(2e)

In another embodiment, the polyetherimide is the reaction product of Bisphenol A dianhydride with 4,4'-diaminodiphenylsulfone. Such a polyetherimide sulfone is commercially available from SABIC as an EXTEM™ resin.

In a further embodiment, the polyetherimide is a blend of polyetherimide homopolymer and polycarbonate which is available from SABIC as an ULTEM™ 9085 resin.

In an alternate embodiment, the build material polysulfone, which includes a repeat unit comprising a divalent aryl ether group and a divalent sulfone group such as in polysulfones (PSU), polyethersulfones (PES), and polyphenylsulfones (PPSU) and poly(biphenyletherdisulfone).

In the method of fused filament fabrication, the method comprises melting a portion of a first filament to form a first thermally-solidifiable material in molten form, and dispensing the first thermally-solidifiable material in molten form in a predetermined pattern so as to define a three-dimensional object; and melting a portion of a second filament to form a second thermally-solidifiable material in molten form, and, in coordination with the dispensing the first thermally solidifiable material, dispensing the second thermally-solidifiable material in molten form so as to define a support structure for the three-dimensional object; wherein the first thermally-solidifiable material comprises a polyetherimide, wherein the second thermally-solidifiable material comprises (a) 95.5 to 99.5 weight percent of an amorphous, thermoplastics resin comprising a Bisphenol A polycarbonate homopolymer and (a) a copolycarbonate of Bisphenol A carbonate units (or "BPA units") and Bisphenol Isophorone carbonate units (or "BPI units") or (b) a BPI polycarbonate homopolymer; wherein the BPI units are 30 to 50 mole percent of the total of BPA units and BPI units in the thermoplastic resin, having a Tg from 165° C. to 200° C., and (b) 0.5 to 4.5 weight percent of a high viscosity silicone, having a kinematic viscosity from 600,000 to 20 million cSt, based upon the combined weight of the thermoplastic resin and silicone in the filament, and wherein the silicone is immiscible with the thermoplastic resin; and wherein the first thermally-solidifiable material has a glass transition temperature or a melting point in a range of within 30° C. of the Tg of the second thermally-solidifiable material.

As used herein, a "thermally-solidifiable material" is a material capable of being solidified on cooling from a molten state.

In one embodiment, the first thermally-solidifiable material has a glass transition temperature or a melting point in a range of within 30° C. of the Tg of the second thermally-solidifiable material.

The method further comprises the step of removing at least a portion of the support structure from the three dimensional model comprising physically separating at least a portion of the support structure from the three-dimensional model.

In some embodiments, the filament or the support structure or the second thermally-solidifiable material is described as comprising an amorphous thermoplastic resin. The term "amorphous thermoplastic resin" can refer to a composition. For example, when the filament comprises an amorphous thermoplastic resin comprising Bisphenol Isophorone carbonate units and Bisphenol A carbonate units, the filament can comprise a composition comprising Bisphenol Isophorone carbonate units and Bisphenol A carbonate units.

The Bisphenol Isophorone carbonate units and Bisphenol A carbonate units can be present in various polymeric forms. In some embodiments, the Bisphenol Isophorone carbonate units and Bisphenol A carbonate units are present in the form of a copolycarbonate comprising Bisphenol A carbonate units and Bisphenol Isophorone carbonate units, or a combination of a Bisphenol A polycarbonate homopolymer and a copolycarbonate comprising Bisphenol A carbonate units and Bisphenol Isophorone carbonate units, or a combination of a Bisphenol A polycarbonate homopolymer and a Bisphenol Isophorone polycarbonate homopolymer, or a combination of a Bisphenol A polycarbonate homopolymer and a Bisphenol Isophorone polycarbonate homopolymer and a copolycarbonate comprising Bisphenol A carbonate units and Bisphenol Isophorone carbonate units. In any of these forms, the sum of Bisphenol Isophorone carbonate units is 30 to 50 mole percent of the total of the sum of Bisphenol A carbonate units and the sum of Bisphenol Isophorone carbonate units.

All of the variations in support material described above in the context of the support filament apply as well to the method of additive manufacturing. The invention includes at least the following aspects.

Aspect 1: An article of manufacture comprising: a filament for use in 3D printing wherein the filament comprises an amorphous thermoplastic resin comprising Bisphenol Isophorone carbonate units and Bisphenol A carbonate units, wherein the Bisphenol Isophorone carbonate units are 30 to 50 mole percent of the total of Bisphenol A carbonate units and Bisphenol Isophorone carbonate units in the amorphous thermoplastic resin, and wherein the amorphous thermoplastic resin has a glass transition temperature from 165° C. to 200° C.; wherein the amorphous thermoplastic resin comprises
(a) (1) a copolycarbonate of Bisphenol A carbonate units and Bisphenol Isophorone carbonate units, and
(2) a Bisphenol A polycarbonate homopolymer, or
(b) (1) 95.5 to 99.5 weight percent of a polycarbonate resin comprising
(i) a copolycarbonate of Bisphenol A carbonate units and Bisphenol Isophorone carbonate units or a BPI polycarbonate homopolymer, and
(ii) optionally a Bisphenol A polycarbonate homopolymer, and
(2) 0.5 to 4.5 weight percent of a high viscosity silicone having a kinematic viscosity from 600,000 to 20 million centistokes at 25° C.,
based upon the combined weight of the polycarbonate resin and the high viscosity silicone, and wherein the high viscosity silicone is immiscible with the polycarbonate resin.

Aspect 2: The article of aspect 1, wherein the amorphous thermoplastic resin comprises
(1) 95.5 to 99.5 weight percent of a polycarbonate resin comprising
(i) a copolycarbonate of Bisphenol A carbonate units and Bisphenol Isophorone carbonate units or a BPI polycarbonate homopolymer, and
(ii) optionally a Bisphenol A polycarbonate homopolymer, and
(2) 0.5 to 4.5 weight percent of a high viscosity silicone having a kinematic viscosity from 600,000 to 20 million centistokes at 25° C.,
based upon the combined weight of the polycarbonate resin and the high viscosity silicone, and wherein the high viscosity silicone is immiscible with the polycarbonate resin.

Aspect 3: The article of aspect 1 wherein the high viscosity silicone comprises a silicone gum.

Aspect 4: The article of aspect 1 wherein the high viscosity silicone comprises (a) 60 to 80 parts by weight of a boro-silicone gum and (b) 20 to 40 parts by weight of a fumed silica.

Aspect 5: The article of aspect 1 wherein the amorphous thermoplastic resin comprises
(a) 65 to 75 parts by weight of a copolycarbonate of Bisphenol Isophorone and Bisphenol A wherein the Bisphenol Isophorone units in the copolycarbonate are 50 to 65 mole percent of the total of Bisphenol A and Bisphenol Isophorone units in the copolycarbonate, and
(b) 25 to 35 parts by weight of a Bisphenol A polycarbonate.

Aspect 6: The article of aspect 1 wherein the filament comprises
(a) 67 to 70 parts by weight of a copolycarbonate of Bisphenol Isophorone and Bisphenol A wherein the Bisphenol Isophorone units in the copolycarbonate are 55 to 65 mole percent of the total of Bisphenol A and Bisphenol Isophorone units in the copolycarbonate,
(b) 23 to 26 parts by weight of a linear Bisphenol A polycarbonate,
(c) 4 to 6 parts by weight of a branched Bisphenol A polycarbonate, and
(d) 1.5 to 2.5 parts by weight of a high viscosity silicone wherein the silicone comprises
(i) 60 to 80 parts by weight of boro-silicone gum and
(ii) 20 to 40 parts by weight of fumed silica.

Aspect 7: An article of manufacture comprising: a support structure comprising an amorphous, thermoplastic resin further comprising Bisphenol Isophorone carbonate units and Bisphenol A carbonate units, wherein the Bisphenol Isophorone carbonate units, are 30 to 50 mole percent of the total of Bisphenol A carbonate units, and Bisphenol Isophorone carbonate units in the resin, and wherein the resin has a glass transition temperature from 165° C. to 200° C.; and a three dimensional model comprising a second thermoplastic resin wherein the second thermoplastic resin and the high heat resin are not the same; wherein at least a portion of a surface of the support structure is adhered to at least a portion of a surface of the three dimensional model; and wherein the amorphous thermoplastic resin comprises
(a) (1) a copolycarbonate of Bisphenol A carbonate units and Bisphenol Isophorone carbonate units, and
 (2) a Bisphenol A polycarbonate homopolymer, or
(b) (1) 95.5 to 99.5 weight percent of a polycarbonate resin comprising
 (i) a copolycarbonate of Bisphenol A carbonate units and Bisphenol Isophorone carbonate units or a BPI polycarbonate homopolymer, and
 (ii) optionally a Bisphenol A polycarbonate homopolymer, and
 (2) 0.5 to 4.5 weight percent of a high viscosity silicone having a kinematic viscosity from 600,000 to 20 million centistokes at 25° C.,
based upon the combined weight of the polycarbonate resin and the high viscosity silicone, and wherein the high viscosity silicone is immiscible with the polycarbonate resin.

Aspect 8: The article of aspect 7 wherein the amorphous thermoplastic resin comprises
(1) 95.5 to 99.5 weight percent of a polycarbonate resin comprising
 (i) a copolycarbonate of Bisphenol A carbonate units and Bisphenol Isophorone carbonate units or a BPI polycarbonate homopolymer, and
 (ii) optionally a Bisphenol A polycarbonate homopolymer, and
(2) 0.5 to 4.5 weight percent of a high viscosity silicone having a kinematic viscosity from 600,000 to 20 million centistokes at 25° C.,
based upon the combined weight of the polycarbonate resin and the high viscosity silicone, and wherein the high viscosity silicone is immiscible with the polycarbonate resin.

Aspect 9: The article of aspect 7 wherein the high viscosity silicone comprises a silicone gum.

Aspect 10: The article of aspect 7 wherein the high viscosity silicone comprises (a) 60 to 80 parts by weight of a boro-silicone gum and (b) 20 to 40 parts by weight of a fumed silica.

Aspect 11: The article of aspect 7 wherein the support structure comprises
(a) 67 to 70 parts by weight of a copolycarbonate of Bisphenol Isophorone and Bisphenol A wherein the Bisphenol Isophorone units in the copolycarbonate are 55 to 65 mole percent of the total of Bisphenol A and Bisphenol Isophorone units in the copolycarbonate,
(b) 23 to 26 parts by weight of a linear Bisphenol A polycarbonate,
(c) 4 to 6 parts by weight of a branched Bisphenol A polycarbonate, and
(d) 1.5 to 2.5 parts by weight of a high viscosity silicone wherein the silicone comprises
 (i) 60 to 80 parts by weight of boro-silicone gum and
 (ii) 20 to 40 parts by weight of fumed silica.

Aspect 12: The article of aspect 7 wherein the second thermoplastic resin comprises a polyetherimide or a polysulfone.

Aspect 13: A method of fused filament fabrication, the method comprising: melting a portion of a first filament to form a first thermally-solidifiable material in molten form, and dispensing the first thermally-solidifiable material in molten form in a predetermined pattern so as to define a three-dimensional model, wherein the first thermally-solidifiable material comprises a polyetherimide or a polysulfone; and melting a portion of a second filament to form a second thermally-solidifiable material in molten form, and, in coordination with the dispensing the first thermally solidifiable material, dispensing the second thermally-solidifiable material in molten form so as to define a support structure for the three-dimensional model; wherein the second thermally-solidifiable material comprises an amorphous thermoplastic resin further comprising Bisphenol Isophorone carbonate units and Bisphenol A carbonate units, wherein the Bisphenol Isophorone carbonate units are 30 to 50 mole percent of the total of Bisphenol A carbonate units and Bisphenol Isophorone carbonate units in the amorphous thermoplastic resin; and wherein the amorphous thermoplastic resin has a glass transition temperature from 165° C. to 200° C.

Aspect 14: The method of aspect 13 wherein the amorphous thermoplastic resin comprises
(a) (1) a copolycarbonate of Bisphenol A carbonate units and Bisphenol Isophorone carbonate units, and
 (2) a Bisphenol A polycarbonate homopolymer, or
(b) (1) 95.5 to 99.5 weight percent of a polycarbonate resin comprising
 (i) a copolycarbonate of Bisphenol A carbonate units and Bisphenol Isophorone carbonate units or a BPI polycarbonate homopolymer, and
 (ii) optionally a Bisphenol A polycarbonate homopolymer, and
 (2) 0.5 to 4.5 weight percent of a high viscosity silicone having a kinematic viscosity from 600,000 to 20 million centistokes at 25° C., based upon the combined weight of the polycarbonate resin and the high viscosity silicone, and wherein the high viscosity silicone is immiscible with the polycarbonate resin.

Aspect 15: The method of aspect 13, further comprising physically separating at least a portion of the support structure from the three-dimensional model.

All ranges disclosed herein are inclusive of the endpoints, and the endpoints are independently combinable with each other. Each range disclosed herein constitutes a disclosure of any point or sub-range lying within the disclosed range.

The invention is further illustrated by the following non-limiting examples.

EXAMPLES

Components used to form comparative and exemplary filaments are summarized in Table 1.

TABLE 1

| Code | Component | Description |
| --- | --- | --- |
| M1 | BPI-PC 200 Tg | Linear amorphous 50/50 (BPI/BPA) mole % copolymer, p-cumyl-phenol end-capped and having a Mw of about 31,000 grams/mole (Polycarbonate standard) |
| M2 | BPI-PC 220 Tg | Linear amorphous 80/20 (BPI/BPA) mole % copolymer, p-cumyl-phenol end-capped and having a Mw of 30,000 grams/mole (Polycarbonate standard) |
| M3 | Covestro APEC2097 | Linear amorphous copolycarbonate supplied by Covestro with MVR (330° C./2.16 kg) 8 cm$^3$/10 min; high viscosity; easy release; UV stabilized; softening temperature (VST/B 120) = 202° C. |

TABLE 1-continued

| Code | Component | Description |
|---|---|---|
| M4 | UDEL P3703 | High flow Polysulfone grade from Solvay Specialty Polymers with a melt flow rate of 17 g/10 min at 343° C./2.16 Kg |
| M5 | PC1 | Linear Bisphenol A polycarbonate, p-cumylphenol end-capped, having a weight average molecular weight of about 36,500 grams/mole and a polydispersity index around 2.5 as determined by gel permeation chromatography using polycarbonate standards |
| M6 | PC2 | Para-cumylphenol endcapped Bisphenol A polycarbonate incorporating the branching agent 1,1,1-tris(4-hydroxyphenyl)-ethane (THPE), and having 0.4 mole percent branching and a weight average molecular weight of about 37,000 grams/mole. |
| M7 | LLDPE - Exxon | Ethylene 1-butene copolymer, CAS Reg. No. 25087-34-7; obtained as ESCORENE ™ LL-5100.09 resin from ExxonMobil. |
| M8 | TOPAS 6017S Cyclic Olefin Copolymer | Cyclic olefin copolymer contains ethylene-norbornene copolymer (CAS 26007-43-2) |
| M9 | Zinc Stearate | Zinc Stearate, CAS Reg. No. 557-05-1; obtained as Zinc Stearate USP from Synpro. |
| M10 | Silicone Beads | Polymethylsilsesquioxane, CAS Reg. No. 68554-70-1, in the form of beads having a number average diameter of about 2 microns; obtained from MOMENTIVE as TOSPEARL 120 resin. |
| M11 | Si Oil (Vicasil) | Dimethylpolysiloxane hydrolyzate; PCAS 63148-62-9; 10,000cSt |
| M12 | FUMED SILICA Cab-o-sil TS-720 | Hydrophobic fumed silica from Cabot Corporation with base silica surface area of 200 m²/gm |
| M13 | Genioplast Pellet S (boro-silicone) | Trimethylsiloxy-endcapped poly(dimethylsiloxane-co-vinylmethylsiloxane) (70 weight percent) on fumed silica (30 weight percent); in the form boro-silicone pellet from Wacker Chemie AG |
| M14 | HINDERED PHENOL ANTI-OXIDANT | Pentaerythritol tetrakis(3-(3,5-di-tert-butyl-4-hydroxyphenyl)propionate) CAS Number 6683-19-8 |
| M15 | PENTAERYTHRITOL TETRASTEARATE | Pentaerythritol tetrastearate, CAS Reg. No. 115-83-3; obtained as PETS G from FACI. |
| M16 | PHOSPHITE STABILIZER | Tris(2,4-di-tert-butylphenyl)phosphite, CAS Reg. No. 31570-04-4; obtained from BASF as IRGAFOS 168. |
| M17 | TiO$_2$ | Titanium dioxide, CAS Reg. No. 13463-67-7, obtained from TIONA ™ 189 from CRISTAL, or as Ti-PURE ™ R-105 from Chemours. |
| M18 | PC3 | Linear Bisphenol A polycarbonate, p-cumylphenol end-capped, CAS Reg. No. 25971-63-5; having a weight average molecular weight of about 21,900 grams/mole and a polydispersity index around 2.5 as determined by gel permeation chromatography using bisphenol A polycarbonate standards. |
| M19 | PC4 | Linear Bisphenol A polycarbonate, p-cumylphenol end-capped, CAS Reg. No. 25971-63-5; having a weight average molecular weight of about 29,900 grams/mole and a polydispersity index around 2.5 as determined by gel permeation chromatography using bisphenol A polycarbonate standards. |
| M20 | PPPBP-PC | Linear amorphous copolycarbonate of isoindolinone bisphenol (35 mole %) and bisphenol A (65 mole %) having a weight average molecular weight of about 25,000 grams/mole as determined by gel permeation chromatography using bisphenol A polycarbonate standards. |

Compositions used to prepare comparative and exemplary filaments are summarized in Table 2, where component amounts are expressed in units of weight percent based on the total weight of the composition. Resin pellets were loaded into a desiccant dryer (Dri-Air; East Windsor, Conn., USA) a day before filament extrusion. Filament was extruded by separately feeding each composition through an extruder (FET, Leeds, UK) equipped with a precision melt pump. The screw for this extruder had a length to diameter ratio of 30:1, with lengths of 10 D in the convey zone, 12 D in the transition zone, and 8 D in the metering section. The melt temperatures were set at about 280° C. to 300° C. The extrudate exited vertically out of a four mm die orifice inner diameter and 16 mm die length and was stretched to form monofilament while being air cooled. The puller line speed was adjusted to achieve a final filament diameter of 1.8 millimeters. On-line diameter measurements were acquired using a dual-axis high speed and high precision scanning micrometer (Keyence; Itasca, Ill., USA).

TABLE 2

| Raw Material | C1 | C2 | C3 | C4 | C5 | C6 | C7 | C8 | C9 | C10 | C11 |
|---|---|---|---|---|---|---|---|---|---|---|---|
| M1 | 99.6 | | | | | | | | | | |
| M2 | | 99.6 | | | | | | | | | |
| M3 | | | 100 | | 97 | 92 | 78 | | | | |
| M4 | | | | 100 | | | | 99.5 | 98.5 | 98 | 99 |
| M5 | | | | | | | 17 | | | | |
| M6 | | | | | | | | | | | |
| M7 | | | | | 3 | | | | | | |
| M8 | | | | | | 8 | 5 | | | | |
| M9 | | | | | | | | 0.5 | 1.5 | | |
| M10 | | | | | | | | | | 2 | |
| M11 | | | | | | | | | | | 1 |
| M12 | | | | | | | | | | | |
| M13 | | | | | | | | | | | |

TABLE 2-continued

| Raw Material | | | | | | | | | | |
|---|---|---|---|---|---|---|---|---|---|---|
| M14 | 0.04 | 0.04 | | | | | | | | |
| M15 | 0.27 | 0.27 | | | | | | | | |
| M16 | 0.08 | 0.08 | | | | | | | | |
| Tg | 194 | 221 | 201 | 189 | 202 | 203 | 190 | N.D. | N.D. | N.D. | N.D. |
| Filament Extrusion | + | + | + | + | + | + | + | + | + | + | − |
| Oozing | Yes | Yes | Yes | No | Yes | Yes | Yes | No | No | No | N.D. |
| Print Quality | Good | Good | Good | Good | Poor | Mod. | Good | Poor | Poor | Good | N.D. |
| Ease of Removal | Poor | Poor | Poor | Poor | Good | Good | Poor | Poor | Poor | Poor | N.D. |

| Raw Material | C12 | C13 | C14 | C15 | C16 | C17 | C18 | C19 | C20 | C21 | C22 |
|---|---|---|---|---|---|---|---|---|---|---|---|
| M1 | | | | | | | | | | | |
| M2 | | | | | | | | | | | |
| M3 | 99 | 76 | 68 | 68.6 | 69.3 | 72 | 62 | 65 | 60 | 76 | 65 |
| M4 | | | | | | | | | | | |
| M5 | | 19 | 29 | 29.4 | 29.7 | 18 | 30 | 30 | 35 | 19 | |
| M6 | | | | | | | | | | | 30 |
| M7 | | | | | | | | | | | |
| M8 | | | | | | | | | | | |
| M9 | | | | | | | | | | | |
| M10 | | 5 | 3 | 2 | 1 | | | | | | |
| M11 | | | | | | | | | | | |
| M12 | | | | | | 10 | | | | | |
| M13 | | | | | | | 8 | 5 | 5 | 5 | 5 |
| M14 | | | | | | | | | | | |
| M15 | 1 | | | | | | | | | | |
| M16 | | | | | | | | | | | |
| Tg | 197 | 190 | 187 | 186 | 186 | 189 | 184 | 183 | 182 | 188 | 179 |
| Filament Extrusion | + | − | − | + | + | + | + | + | + | + | + |
| Oozing | Yes | Yes | Yes | Yes | Yes | Yes | Yes | Yes | Yes | Yes | Yes |
| Print Quality | Mod. | No | No | Good | Good | No | N.D. | Good | N.D. | Good | Good |
| Ease of Removal | Good | N.D. | Poor | Poor | Poor | N.D. | N.D. | Good | N.D. | Good | Good |

| Raw Material | Ex 1 | Ex 2 | Ex 3 | Ex 4 | Ex 5 | Ex 6 | Ex 7 | Ex 8 | Ex 9 | Ex 10 |
|---|---|---|---|---|---|---|---|---|---|---|
| M1 | | | | | | | | | | |
| M2 | | | | | | | | | | |
| M3 | 65 | 60 | 70 | 70 | 69.3 | 68.6 | 67.9 | 68.2 | 69.1 | |
| M4 | | | | | | | | | | 98 |
| M5 | 35 | 40 | 30 | | 29.7 | 29.4 | 29.1 | 24.3 | 14.7 | |
| M6 | | | | 30 | | | | 5 | 14.7 | |
| M7 | | | | | | | | | | |
| M8 | | | | | | | | | | |
| M9 | | | | | | | | | | |
| M10 | | | | | | | | | | |
| M11 | | | | | | | | | | |
| M12 | | | | | | | | | | |
| M13 | | | | | 1 | 2 | 3 | 2 | 1.5 | 2 |
| M14 | | | | | | | | 0.2 | | |
| M15 | | | | | | | | | | |
| M16 | | | | | | | | 0.3 | | |
| Tg | 180 | 177 | 189 | 189 | 187 | 186 | 186 | 182 | 186 | N.D. |
| Filament Extrusion | + | + | + | + | + | + | + | + | + | + |
| Oozing | No | No | No | No | No | No | No | No | No | No |
| Print Quality | Good | Good | Good | Good | Good | Good | Good | Good | Good | Good |
| Ease of Removal | Poor | Poor | Good | Good | Good | Good | Good | Good | Good | Good |

The glass transition Temperature (Tg) of each filament was determined using differential scanning calorimetry, in accordance with ASTM D3418, with a 20° C./min heating rate (hereinafter "DSC") by using a TA Instruments Q1000 Differential Scanning calorimeter. in a temperature range from 0 to 250° C. at a heating rate of 20° C. per minute under nitrogen flow.

After extruding a filament for each composition in Table 2, the quality of each of these filaments was evaluated. A filament extrusion rating of "−" indicates the, using the aforementioned procedure, the composition was not extruded to a targeted diameter within +/−0.010 millimeter or could not achieve a standard deviation of within 0.010 millimeter. A rating of "+" indicates the composition was extruded to a targeted diameter within +/−0.010 millimeter and with a standard deviation of within 0.010 millimeter.

Experimental structures, including model structures in various simple and complex geometries and breakaway support structures, were printed using Stratasys 400mc and 900mc printers using a polyetherimide filament, made from ULTEM™ 9085 resin, as the model material and using each filament of Table 2 as the support material. As an experimental control, the same structure designs were printed using polyetherimide, model or build filament, made from ULTEM™ 9085 resin and a polysulfone support filament, specifically a filament comprising a phenol, 4,4'(1-methylethylidene)bis-polymer with 1,1'-sulfonylbis(4-chlorobenzene), (3-chloropropyl)trimethoxysilane-terminated resin, available from Stratasys Ltd. and disclosed as a breakaway support for models made from ULTEM™ 9085 resin. Both the experimental structures and support structures were concurrently printed together using the printer's support temperature profile for filament made from ULTEM™ 9085 resin. Under this temperature profile, a T16 or T20 tip was used to print the model, and a T16 tip was used to print basic support structures.

During printing, the degree of oozing and the quality of printing of each support material from the T16 tip was evaluated. Oozing of the support material can create unplanned support material strands or hairs that may degrade the print quality of the model negatively and lead to support material being embedded within the model being printed. A rating of "Yes" indicates that an unacceptable level of oozing was observed that would likely degrade the quality of the printed model. A rating of "No" indicates slight oozing was observed that did not adversely affect the print quality of the model.

The quality of the printing of support structures using each support material was evaluated based upon the printing factors: tool path tracking, self- and cross-adhesion, overhang catch (at 15, 30, 45, and 50 degrees), surface quality, ability to support printing the design, and consistent printing with no printer jams. A printing quality rating of "Good" indicates good self-adhesion, good overhang catch at 15, 30, 45, and 50 degrees, good surface quality, and good ability to support several designs. A printing quality rating of "Poor" indicates one or more of the following: poor overhang catch, poor surface quality, tip clogging, inability to support several designs, missing toolpaths, overfilling or under filling. A printing quality rating of "Medium" indicates some degree of under filling and gaps in toolpaths. A rating of N.D. means that the print quality was not determined.

After completing printing the model and support structure, for each different support filament, the ability, to readily break away each support material from the ULTEM 9085 resin model, at room temperature, was qualitatively evaluated (pliability, ease of breaking into, effort needed to remove, and size of pieces breaking off). An ease of removal rating of "Good" indicates good pliability, ease of breaking into support structure, ease of removal of all support structure, and comes off in large pieces. It also indicates that the support material comes off easily compared to commercial polysulfone support material for ULTEM™ 9085 resin build material. A rating of "Poor" means one or more of the following: poor pliability, difficulty breaking into the support structure, inability to remove all support structure, and support structure removal in small pieces.

As shown in Table 2, the support filament compositions that performed significantly better in terms of ease of making filaments, mitigation of support material oozing, overall print quality and subsequent ease of removal from the printed model, particularly when compared to the polysulfone commercial support filament, used herein as a control, or a support filament consisting of APEC® 2097 resin (C3 in Table 2). The control support filament was found to provide good performance in terms of filament extrusion, lack of oozing and print quality. However, it was also found that control filament support structures were very difficult to remove from the models made from ULTEM™ 9085 resin. The APEC® 2097 resin (C3) support filament was found to provide good performance in terms of filament extrusion and print quality. However, it exhibited unacceptable levels of oozing and was also difficult to remove from the models made from ULTEM™ 9085 resin. The support filaments exemplified herein, particularly Ex3, Ex4, Ex5, Ex6, Ex7, Ex8, Ex9 and Ex10, still demonstrated good performance in terms of filament extrusion and print quality but, in an unexpected improvement as compared to the control and the APEC® 2097 resin filaments' performance, also showed acceptable levels of oozing and good ease of removal from the models made from ULTEM™ 9085 resin.

The following comparative examples illustrate the poor performance of support materials based on a copolycarbonate comprising bisphenol A carbonate units and 3,3-bis(4-hydroxyphenyl)-2-phenylisoindolin-1-one (PPPBP) carbonate units. Compositions for support filaments are summarized in Table 3.

Filaments were extruded and articles with model and support structures were printed as described above. The model material was ULTEM™ 9085 resin. For each support material, oozing, print quality, and ease of removal were determined as described above. Each of the support materials performed poorly in that the level of oozing was unacceptable, print quality was medium or poor, and ease of removal of the support from the model was poor.

TABLE 3

|  | C23 | C24 | C25 | C26 | C27 |
| --- | --- | --- | --- | --- | --- |
| COMPOSITIONS |  |  |  |  |  |
| M18 | 8.9 | 8.7 | 8.3 | 0 | 0 |
| M19 | 8.9 | 8.7 | 8.3 | 0 | 0 |
| M20 | 81 | 79.5 | 75.1 | 77.61 | 76.91 |
| M5 | 0 | 0 | 0 | 17 | 16.7 |
| M8 | 0 | 3 | 0 | 0 | 0 |
| M14 | 0.04 | 0.04 | 0.04 | 0.04 | 0.04 |
| M15 | 1 | 0 | 0.27 | 0.27 | 0.27 |
| M16 | 0.08 | 0.08 | 0.08 | 0.08 | 0.08 |
| M8 | 0 | 0 | 8 | 5 | 5 |
| M17 | 0 | 0 | 0 | 0 | 1 |
| PROPERTIES |  |  |  |  |  |
| Oozing | Yes | Yes | Yes | Yes | Yes |
| Print Quality | Medium | Medium | Poor | Medium | Medium |
| Ease of Removal | Poor | Poor | Poor | Poor | Poor |

The invention claimed is:

1. An article of manufacture comprising:

a filament for use in 3D printing wherein the filament comprises an amorphous thermoplastic resin comprising Bisphenol Isophorone carbonate units and Bisphenol A carbonate units, wherein the Bisphenol Isophorone carbonate units are 30 to 50 mole percent of the total of Bisphenol A carbonate units and Bisphenol Isophorone carbonate units in the amorphous thermoplastic resin, and wherein the amorphous thermoplastic resin has a glass transition temperature from 165° C. to 200° C.;

wherein the amorphous thermoplastic resin comprises
(a) (1) a copolycarbonate of Bisphenol A carbonate units and Bisphenol Isophorone carbonate units, and
(2) a Bisphenol A polycarbonate homopolymer, or
(b) (1) 95.5 to 99.5 weight percent of a polycarbonate resin comprising
(i) a copolycarbonate of Bisphenol A carbonate units and Bisphenol Isophorone carbonate units or a BPI polycarbonate homopolymer, and
(ii) optionally a Bisphenol A polycarbonate homopolymer, and
(2) 0.5 to 4.5 weight percent of a high viscosity silicone having a kinematic viscosity from 600,000 to 20 million centistokes at 25° C.,
based upon the combined weight of the polycarbonate resin and the high viscosity silicone, and wherein the high viscosity silicone is immiscible with the polycarbonate resin.

2. The article of claim 1, wherein the amorphous thermoplastic resin comprises
(1) 95.5 to 99.5 weight percent of a polycarbonate resin comprising
(i) a copolycarbonate of Bisphenol A carbonate units and Bisphenol Isophorone carbonate units or a BPI polycarbonate homopolymer, and
(ii) optionally a Bisphenol A polycarbonate homopolymer, and
(2) 0.5 to 4.5 weight percent of a high viscosity silicone having a kinematic viscosity from 600,000 to 20 million centistokes at 25° C.,
based upon the combined weight of the polycarbonate resin and the high viscosity silicone, and wherein the high viscosity silicone is immiscible with the polycarbonate resin.

3. The article of claim 1 wherein the high viscosity silicone comprises a silicone gum.

4. The article of claim 1 wherein the high viscosity silicone comprises
(a) 60 to 80 parts by weight of a boro-silicone gum and
(b) 20 to 40 parts by weight of a fumed silica.

5. The article of claim 1 wherein the amorphous thermoplastic resin comprises
(a) 65 to 75 parts by weight of a copolycarbonate of Bisphenol Isophorone and Bisphenol A wherein the Bisphenol Isophorone units in the copolycarbonate are 50 to 65 mole percent of the total of Bisphenol A and Bisphenol Isophorone units in the copolycarbonate, and
(b) 25 to 35 parts by weight of a Bisphenol A polycarbonate.

6. The article of claim 1 wherein the filament comprises
(a) 67 to 70 parts by weight of a copolycarbonate of Bisphenol Isophorone and Bisphenol A wherein the Bisphenol Isophorone units in the copolycarbonate are 55 to 65 mole percent of the total of Bisphenol A and Bisphenol Isophorone units in the copolycarbonate,
(b) 23 to 26 parts by weight of a linear Bisphenol A polycarbonate,
(c) 4 to 6 parts by weight of a branched Bisphenol A polycarbonate, and
(d) 1.5 to 2.5 parts by weight of a high viscosity silicone wherein the silicone comprises
(i) 60 to 80 parts by weight of boro-silicone gum and
(ii) 20 to 40 parts by weight of fumed silica.

7. An article of manufacture comprising:
a support structure comprising an amorphous, thermoplastic resin further comprising Bisphenol Isophorone carbonate units and Bisphenol A carbonate units, wherein the Bisphenol Isophorone carbonate units, are 30 to 50 mole percent of the total of Bisphenol A carbonate units, and Bisphenol Isophorone carbonate units in the resin, and wherein the resin has a glass transition temperature from 165° C. to 200° C.; and
a three dimensional model comprising a second thermoplastic resin wherein the second thermoplastic resin and the high heat resin are not the same;
wherein at least a portion of a surface of the support structure is adhered to at least a portion of a surface of the three dimensional model; and
wherein the amorphous thermoplastic resin comprises
(a) (1) a copolycarbonate of Bisphenol A carbonate units and Bisphenol Isophorone carbonate units, and
(2) a Bisphenol A polycarbonate homopolymer, or
(b) (1) 95.5 to 99.5 weight percent of a polycarbonate resin comprising
(i) a copolycarbonate of Bisphenol A carbonate units and Bisphenol Isophorone carbonate units or a BPI polycarbonate homopolymer, and
(ii) optionally a Bisphenol A polycarbonate homopolymer, and
(2) 0.5 to 4.5 weight percent of a high viscosity silicone having a kinematic viscosity from 600,000 to 20 million centistokes at 25° C.,
based upon the combined weight of the polycarbonate resin and the high viscosity silicone, and wherein the high viscosity silicone is immiscible with the polycarbonate resin.

8. The article of claim 7 wherein the amorphous thermoplastic resin comprises
(1) 95.5 to 99.5 weight percent of a polycarbonate resin comprising
(i) a copolycarbonate of Bisphenol A carbonate units and Bisphenol Isophorone carbonate units or a BPI polycarbonate homopolymer, and
(ii) optionally a Bisphenol A polycarbonate homopolymer, and
(2) 0.5 to 4.5 weight percent of a high viscosity silicone having a kinematic viscosity from 600,000 to 20 million centistokes at 25° C.,
based upon the combined weight of the polycarbonate resin and the high viscosity silicone, and wherein the high viscosity silicone is immiscible with the polycarbonate resin.

9. The article of claim 7 wherein the high viscosity silicone comprises a silicone gum.

10. The article of claim 7 wherein the high viscosity silicone comprises
(a) 60 to 80 parts by weight of a boro-silicone gum and
(b) 20 to 40 parts by weight of a fumed silica.

11. The article of claim 7 wherein the support structure comprises
(a) 67 to 70 parts by weight of a copolycarbonate of Bisphenol Isophorone and Bisphenol A wherein the Bisphenol Isophorone units in the copolycarbonate are 55 to 65 mole percent of the total of Bisphenol A and Bisphenol Isophorone units in the copolycarbonate,
(b) 23 to 26 parts by weight of a linear Bisphenol A polycarbonate,
(c) 4 to 6 parts by weight of a branched Bisphenol A polycarbonate, and
(d) 1.5 to 2.5 parts by weight of a high viscosity silicone wherein the silicone comprises
(i) 60 to 80 parts by weight of boro-silicone gum and
(ii) 20 to 40 parts by weight of fumed silica.

12. The article of claim 7 wherein the second thermoplastic resin comprises a polyetherimide or a polysulfone.

13. A method of fused filament fabrication, the method comprising:
- melting a portion of a first filament to form a first thermally-solidifiable material in molten form, and dispensing the first thermally-solidifiable material in molten form in a predetermined pattern so as to define a three-dimensional model, wherein the first thermally-solidifiable material comprises a polyetherimide or a polysulfone; and
- melting a portion of a second filament to form a second thermally-solidifiable material in molten form, and, in coordination with the dispensing the first thermally solidifiable material, dispensing the second thermally-solidifiable material in molten form so as to define a support structure for the three-dimensional model;
- wherein the second thermally-solidifiable material comprises an amorphous thermoplastic resin further comprising Bisphenol Isophorone carbonate units and Bisphenol A carbonate units, wherein the Bisphenol Isophorone carbonate units are 30 to 50 mole percent of the total of Bisphenol A carbonate units and Bisphenol Isophorone carbonate units in the amorphous thermoplastic resin; and
- wherein the amorphous thermoplastic resin has a glass transition temperature from 165° C. to 200° C.

14. The method of claim 13 wherein the amorphous thermoplastic resin comprises
- (a) (1) a copolycarbonate of Bisphenol A carbonate units and Bisphenol Isophorone carbonate units, and
  (2) a Bisphenol A polycarbonate homopolymer, or
- (b) (1) 95.5 to 99.5 weight percent of a polycarbonate resin comprising
  - (i) a copolycarbonate of Bisphenol A carbonate units and Bisphenol Isophorone carbonate units or a BPI polycarbonate homopolymer, and
  - (ii) optionally a Bisphenol A polycarbonate homopolymer, and
  (2) 0.5 to 4.5 weight percent of a high viscosity silicone having a kinematic viscosity from 600,000 to 20 million centistokes at 25° C.,
  based upon the combined weight of the polycarbonate resin and the high viscosity silicone, and wherein the high viscosity silicone is immiscible with the polycarbonate resin.

15. The method of claim 13, further comprising physically separating at least a portion of the support structure from the three-dimensional model.

* * * * *